United States Patent Office 2,750,183
Patented June 12, 1956

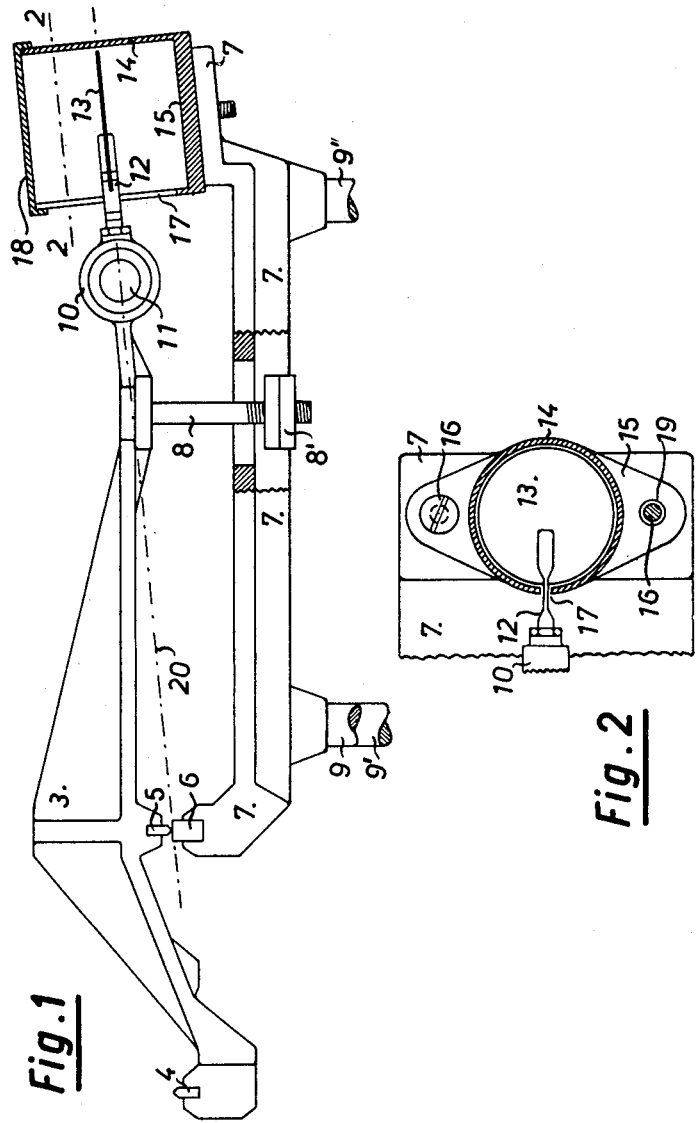

2,750,183

ANALYTICAL BALANCE

Bojan Kriznic, Meilen (Zurich), Switzerland, assignor to Erhard Karl Mettler, Zurich, Switzerland Application June 24, 1955, Serial No. 517,754

Claims priority, application Switzerland October 29, 1954

4 Claims. (Cl. 265—49)

This invention relates to an analytical balance and more particularly to a micro balance having an unsymmetrical balance beam and an air-damping device for damping pendulum movements of the balance beam.

Objects of the invention are to provide an analytical balance of the type stated comprising an unsymmetrical balance beam which has an intermediate knife edge offset from its centre, an outer knife edge on its shorter arm, and a counterweight mounted rigidly on its longer arm; a carrier having a pivot for supporting the intermediate knife edge of the balance beam, an air-damping cup mounted adjustably on said carrier and having a longitudinal slot, a holder fastened to the extreme end of the longer arm of the balance beam and projecting with clearance through said slot, a damping disc fastened to said holder and disposed to be movable with clearance inside the air-damping cup, said air-damping cup being open on one side of said slot for enabling a guiding-in of the damping disc, and a removable cover for closing the air-damping cup in order to produce a symmetrically acting damping of the pendulum movements of the unsymmetrical balance beam. A further object of the invention is an analytical balance of the type outlined wherein said damping disc extends in a plane which contains the edge of said intermediate knife edge of the unsymmetrical balance beam, said holder is fastened to the longer arm of the balance beam to be symmetrical with respect of said plane, and said damping cup is mounted in such manner on said carrier, that in the middle position of the balance beam the damping disc is situated centrally between the cover and the bottom of the air-damping cup.

These and other objects and the advantages of the invention will best be understood from the following description of a specific embodiment when read in connection with the accompanying drawing, wherein like reference characters indicate like parts throughout the figures and in which:

Figure 1 is a front elevation of the unsymmetrical balance beam, the damping device acting on its longer arm being shown in section, and Figure 2 is a cross-section on the line 2—2 in Figure 1, through the damping device.

The unsymmetrical balance beam 3 of an analytical or micro balance has on its shorter arm an outer knife edge 4 from which is suspended the usual carrying means (not shown in detail in Figure 1) for the balance pan and the removable weights. In the operational state of the balance beam 3, its intermediate knife edge 5 is fulcrumed on the plane pivot 6, which is fastened in a carrier 7. The longer arm of the balance beam carries on its screw bolt 8 the counterweight 8'. By means of three columns 9, 9', 9" the carrier 7 is supported on a base (not shown). Furthermore, the longer arm of the balance beam has a mounting 10 to accommodate a graduated plate 11, which in conjunction with an optical and illuminating device, not illustrated, provides an optical reading of the inclination of the balance beam 3. A holder 12 is mounted on the extreme end of the longer arm of the balance beam. This holder carries a damping disc 13 of an air-damping device. The damping disc 13 is situated so as to be freely movable with some clearance inside a damping cup 14, the bottom part 15 of which is screwed by means of two headed screws 16 to the carrier 7. In Figure 2 one of said headed screws 16 is illustrated in section. The damping cup 14 has a longitudinal slot 17 along its generatrix, through which the holder 12 projects with clearance. The upper side of the damping cup 14 is closed with an attached and easily removable cover 18. The holder 12 has a tapered cross-section where it passes through the slot 17. In order to correctly adjust the damping cup 14, the foot part 15 has screw apertures 19 (Figure 2), which have a larger diameter than the screw bolts of the headed screws 16. When the screws 16 are lightly released, the damping cup 14 may be displaced as whole by small amounts until the damping disc 13 and the holder 12 are freely movable, without touching the damping cup 14. The headed screws 16 may then be tightened to retain this position of the air-damping cup 14. This adjustment of the damping cup 14 is best effected with the cover 18 removed. It is then possible, according to Figure 2, to determine with ease the correct position of the damping cup 14 in relation to the damping disc 13 and its holder 12. Furthermore, as shown in Figure 1, the damping disc 13 extends in a plane 20, shown in dotted line, which contains the edge of the intermediate knife edge 5 of the balance beam 3 and the holder 12 is symmetrical with respect of this plane.

In Figure 1 the balance beam 3 is shown in its middle position, in which a straight line running through the edges of the knife edges 4 and 5 runs horizontally. When the balance is in use, the balance beam 3 may assume slightly inclined positions upwardly or downwardly in relation to this middle position. The damping device is now designed and constructed in such manner that in this middle position of the balance beam 3 the damping disc 13 is situated exactly in the middle between the inner surfaces of the cover 18 and the bottom 15. On both sides of the damping disc 13 there are accordingly the same air volumes and the parts of the longitudinal slot 17 extending above and below the holder 12 are each equal. These conditions alter in practice only insignificantly when the balance 3 assumes a slightly inclined position, since the movement occurring in the damping disc 13 remain small by comparison with the height of the damping cup 14. Fluctuations in the external air pressure, which are produced for example by the opening or closing of a door or by air-conditioning installations, therefore are transmitted in a practically symmetrical manner through the longitudinal slot 17. These fluctuations do not exert displacing forces on the damping disc 13 and the pendulum movements of the balance beam 3 are independently of these fluctuations damped out. In addition, the damping disc 13 causes an obviously symmetrically acting damping, because when deviations from the shown middle position occur the volume of air present on one side of the damping disc 13 always becomes greater by an equal amount as it becomes reduced on the other side of the damping disc 13.

The balance beam 3 may easily be removed for transport of the balance. It is only necessary to take off the cover 18 in order to be able to remove the damping disc 13 together with the holder 12 from the cup 14. When the damping disc 13 has been guided out the balance beam 3 is removed as a whole.

The invention is not limited to the particular embodiment herein shown and described. For a micro balance of the type outlined it is advisable to provide a housing which encloses all the movable parts. This and other modifications which may occur to those familiar with the art fall within the spirit and scope of the invention as set forth in the following claims.

I claim:

1. An analytical balance, comprising an unsymmetrical balance beam having an intermediate knife edge offset from its centre, an outer knife edge mounted on its shorter arm, and a counterweight mounted rigidly on its longer arm; a carrier having a pivot for supporting said intermediate knife edge of said balance beam, an air-damping cup mounted on said carrier and having a longitudinal slot, a holder fastened to the longer arm of said balance beam and projecting with clearance through said longitudinal slot, a damping disc fastened to said holder and disposed to be movable with clearance inside said air-damping cup, said air-damping cup being open on one side of said slot enabling a guiding-in of said damping disc, and a removable cover for closing said air-damping cup in order to produce a symmetrically acting damping of the pendulum movements of said unsymmetrical balance beam.

2. The invention as recited in claim 1, wherein said holder is fastened to the extreme end of said longer arm of the baalnce beam and the air-damping cup is fastened on said carrier with the removable cover uppermost.

3. An analytical balance, comprising an unsymmetrical balance beam having an intermediate knife edge offset from its centre, an outer knife edge mounted on its shorter arm, and a counterweight mounted rigidly on its longer arm; a carrier having a pivot for supporting said intermediate knife edge of said balance beam, an air-damping cup mounted on said carrier and having a longitudinal slot, a holder fastened to the longer arm of said balance beam and projecting with clearance through said slot, a damping disc fastened to said holder and disposed to be movable with clearance inside said air-damping cup, said damping disc extending in a plane which contains the edge of said intermediate knife edge of said balance beam, said holder being fastened to said longer arm of said balance beam to be symmetrical with respect of said plane, said air-damping cup being open on one side of said slot for enabling a guiding-in of said damping disc, and a removable cover attached to said air-damping cup in order to close said air-damping cup and to produce a symmetrically acting damping of the pendulum movements of said unsymmetrical balance beam.

4. The invention as recited in claim 3, wherein said air-damping cup is adjustably fastened on said carrier and is so disposed that in the middle position of said unsymmetrical balance beam said damping disc is situated centrally between the bottom and the cover of said air-damping cup and the parts of said longitudinal slot are equal on both sides of said holder for the damping disc.

References Cited in the file of this patent

UNITED STATES PATENTS

| 1,709,471 | Hallwood | Apr. 6, 1929 |
| 2,006,255 | Best | June 25, 1935 |

FOREIGN PATENTS

| 224,507 | Great Britain | Jan. 8, 1925 |